Dec. 12, 1967 J. MORKOSKI 3,357,467
DAMAGE PROTECTED MATERIAL CHOPPING DEVICE
Filed Oct. 15, 1964 3 Sheets-Sheet 2

Inventor:
James Morkoski
By John J. Kowalik
Atty.

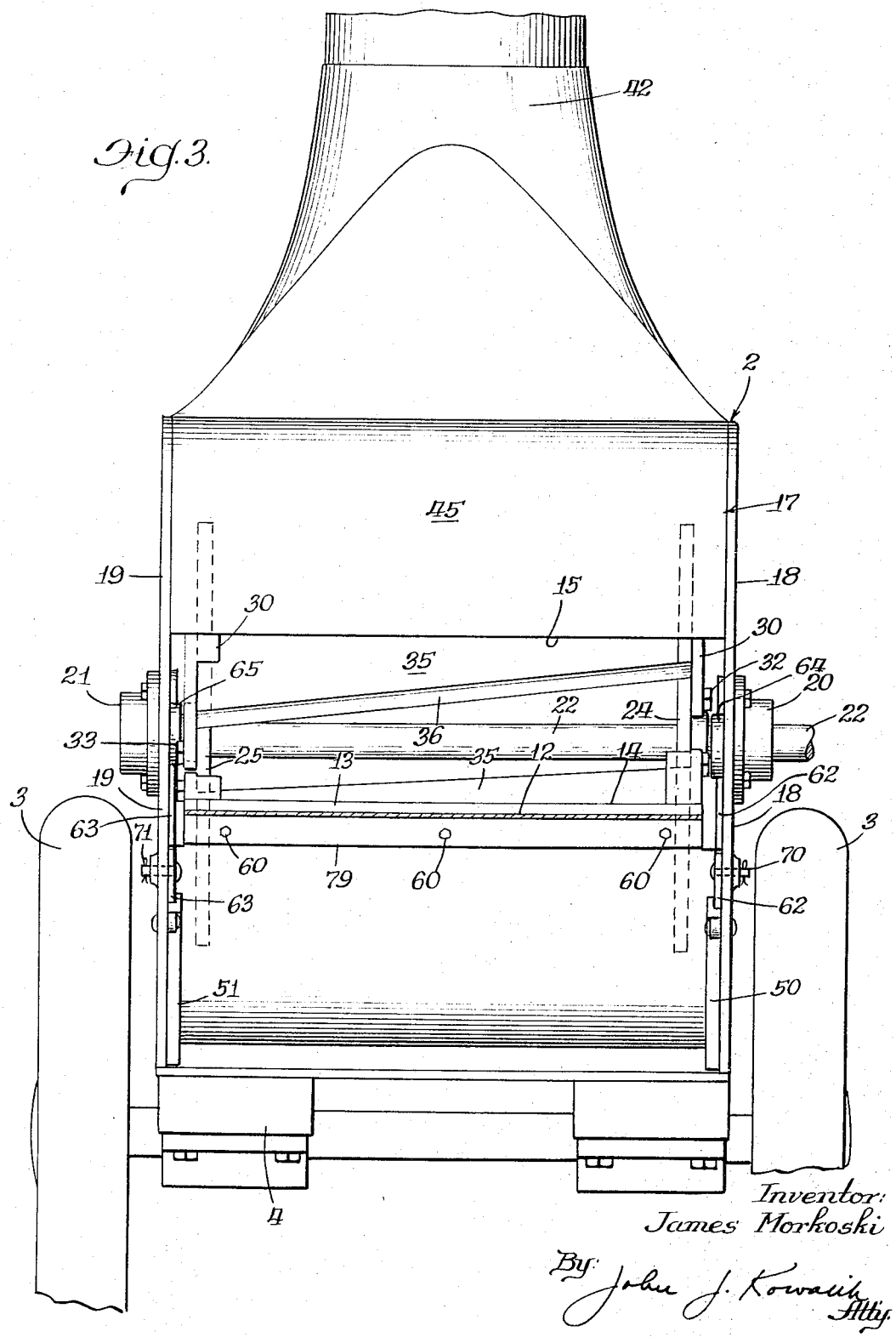

United States Patent Office 3,357,467
Patented Dec. 12, 1967

3,357,467
DAMAGE PROTECTED MATERIAL
CHOPPING DEVICE
James Morkoski, Clarendon Hills, Ill., assignor to
International Harvester Company, a corporation
of Delaware
Filed Oct. 15, 1964, Ser. No. 404,020
16 Claims. (Cl. 146—117)

ABSTRACT OF THE DISCLOSURE

A chopper having a generally cylindrical housing including a pair of opposed side walls and arcuate wall sections between the side walls defining circumferentially spaced inlet and outlet openings, a shear bar on one wall section, a cutter journalled between the walls in shearing coaction with the shear bar, and a break-away connection securing the wall section mounting the shear bar and accommodating separation of that wall section from the housing upon the imposition of a load thereon beyond a predetermined limit.

---

This invention relates to choppers for material, such as forage harvesters and the like, although not restricted thereto, and more specifically to a novel means for minimizing damage to the chopper upon accidental introduction of unshearable objects.

In choppers and particularly those used in forage harvesting machines, extensive damage occurs to the cutterhead and/or the housing encasing the cutterhead when an unshearable object is accidentally introduced into the cutterhead. The damage can be so extensive as to require entire replacement of the cutterhead and/or the housing portions. Heretofore, no practical solution has occurred to minimize such damage.

A general object of the invention is to provide a novel chopper incorporating means to reduce the damage upon the introduction to the chopper of an unshearable object.

A further object of the invention is to provide a novel chopper comprising a rotor head carrying a plurality of knives cooperable with a shear bar, said shear bar being supported to yield under the impact of an unshearable object as it is struck by a knife.

A further object of the invention is to provide a cutter incorporating a rotary cutterhead mounting knife means thereon, said knife means cooperating with a shear bar and the shear bar being mounted on a section of a housing enclosing the cutterhead, the shear bar and housing section being movable in the direction of impact upon an object, which is unshearable, being introduced between the knife means and the shear bar whereby the shear bar and housing sections are adapted to yield after a predetermined load to prevent extensive damage to the knife means and the housing.

More specifically the invention contemplates the provision of a cylindrical cutterhead having a plurality of peripheral knife means, the cutterhead being encased within a cylindrical housing which is provided with circumferentially displaced inlet and outlet openings, the inlet opening being defined at one edge by a shear bar which is cooperatively associated with the knife blades for shearing action therewith, said shear bar being mounted on a section of said housing which is swingable about the axis of rotation of the cutterhead when an unshearable object is introduced between the knife sections and the shear bar.

A further object of the invention is to provide a novel chopper construction wherein a portion of the housing of the chopper is movable from a normal operating position to a position closing the discharge opening of the housing attendant to the introduction of an unshearable object between the shear bar and any of the knife sections of the rotor.

A still further object of the invention is to provide a novel chopper comprising a generally cylindrical housing with circumferentially displaced inlet and outlet openings, said housing being segmented and including a section carrying a shear bar at one side of the inlet opening, and the said section being swingable about the axis of the rotation of the cutterhead encased within the housing from its operating position to a position closing the outlet opening.

A corollary object to the foregoing object is to provide a novel braking mechanism carried by the stationary part of the housing and engaging the movable part of the housing so as to resist free rotation of the movable part of the housing.

A different object of the invention is to provide a novel mechanism for limiting the rotation or the movement of the movable section of the housing.

These and other objects and advantages inherent in and encompassed by the invention become more apparent from the specification and drawings wherein:

FIGURE 3 is a front elevational view taken substantially on the line 3—3 of FIGURE 1;

FIGURES 5 and 6 illustrate a modified form of the invention;

Figure 1:
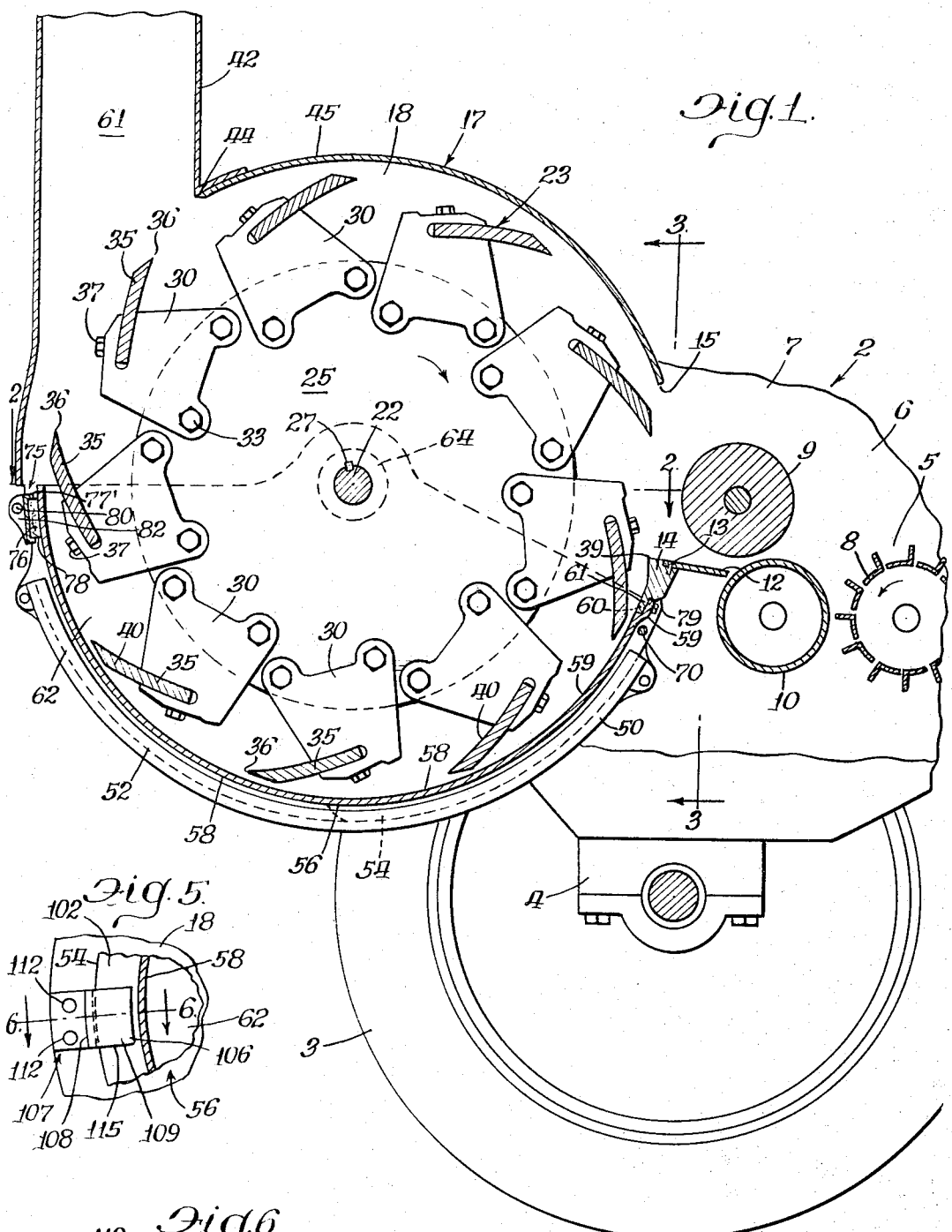
FIGURE 1 is a transaxial sectional view of my novel chopperhead shown in association with conveying means of a conventional forage harvester showing the parts in operative position.
Figure 2:
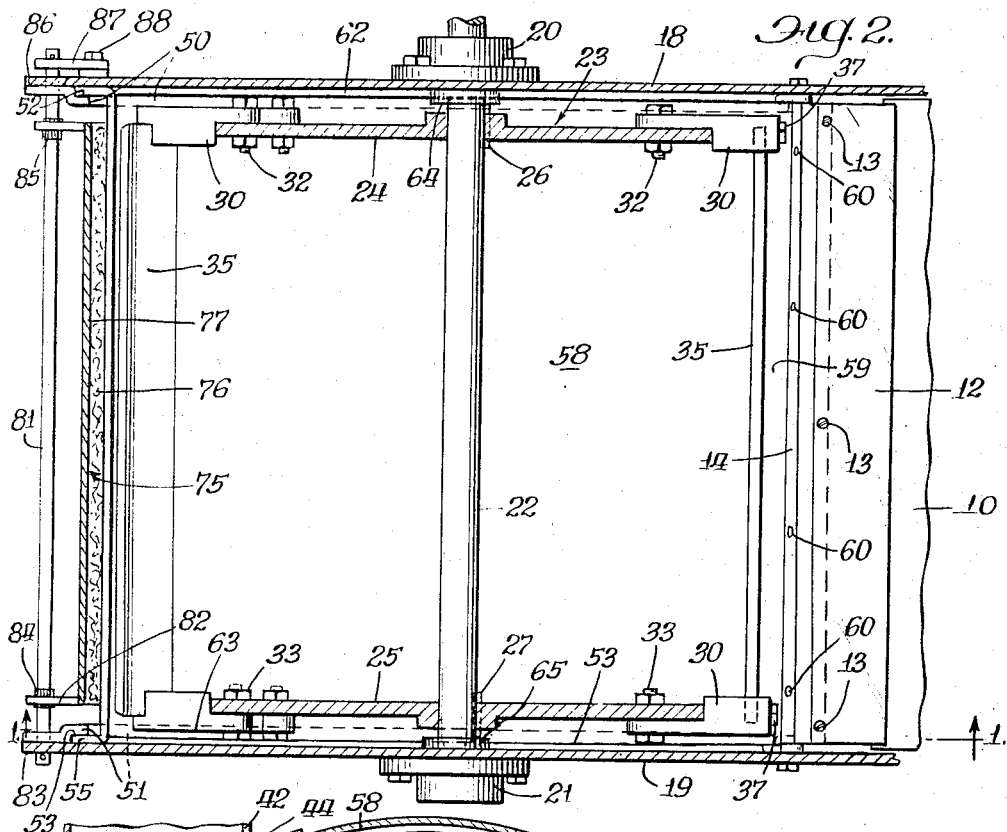
FIGURE 2 is a radial sectional view taken substantially on the line 2—2 of FIGURE 1.

FIGURE 5 being a fragmentary section comparable to FIGURE 1; and

FIGURE 6 being a cross section taken substantially on the line 6—6 of FIGURE 6.

Description of FIGURES 1–4

Describing the invention in detail and having particular reference to FIGURES 1–4 of the drawings, the invention is shown in association with a harvesting machine generally indicated 2, although it will be appreciated that the device may be disassociated from a harvesting machine and may be used in connection with a forage chopper or the like or in any other chopping machine.

The harvester 2 comprises supporting wheel means 3 which carry a framework 4 suitably constructed for mounting a transition conveying means 5 which may include a transition housing 6 having appropriate side walls 7 on which are mounted or journalled the conveying means herein shown as a roller 8 and the opposed feed rollers 9 and 10. As best seen in FIGURE 1 the material is fed over a bendable thin metal combination guide and scraper plate 12 which is recessed as at 13 and secured as by bolts to a shear bar 14 which forms the lower edge of an inlet opening 15 for a generally cylindrical shaped chopper housing 17.

The housing 17 incorporates the pair of vertical side walls 18 and 19 which support bearing journals 20 and 21 upon which is mounted the rotor shaft 22 of the chopper rotor generally designated 23.

The chopper rotor 23 in addition to the shaft 22, which may be driven from any suitable power source externally of the housing 17, includes a pair of laterally or axially spaced mounting plates 24 and 25 which are suitably secured as by keys 26 and 27 to the shaft 22 and constrained for rotation therewith. The plates 24 and 25 provide supports for knife mounting brackets 30 which are spaced circumferentially of the plates 24 and 25 and attached to the respective plates thereof as by bolts 32, 33. The knife supports 30 mount a plurality of knife blades 35 which have forwardly beveled sharpened edges 36. The blades 35 are secured as by bolts 37 to the respective back-holders 30 so that the edges 36 run in a common circle in close proximity to and in shearing relation to the shearing edge 39 of the shear bar 14. Thus it will be realized that as the material is entered into the housing through the inlet opening 15 the knife blades in advancing downwardly pursuant to rotation of the rotor in a clockwise direction as shown by the arrow in FIGURES 1 and 4 will be sheared into predetermined length depending upon the speed of rotation of the rotor and the number of knife blades mounted thereon and the material will be carried under the rotor preferably on the inner sides 40 of the blades 35 for a substantial distance and then be thrown upwardly and outwardly of the rotor through a substantially tangential outlet duct 42.

The material is prevented from recirculating by a cutoff edge developed at 44 at the inner end of an arcuate top wall portion 45 of the housing.

As well known to those skilled in the art, the introduction of foreign material into the rotor is extremely destructive. The knife blades break in attempting to shear an object, such as a stone or more commonly a piece of metal which usually is lost from machinery operating in the field, and invariably the shear bar and the lower portion of the housing are totally destroyed.

Figure 4:
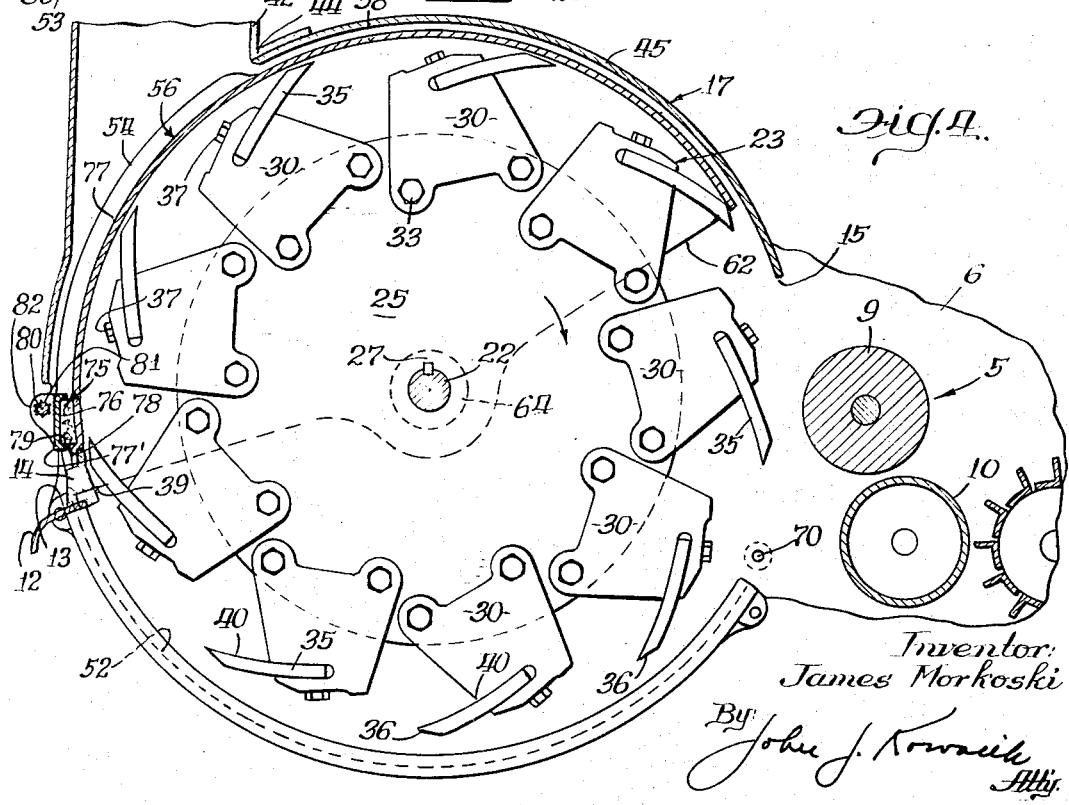
FIGURE 4 is a view comparable to FIGURE 2 showing the parts in relief position.

As best seen in FIGURES 1 and 4, the present invention provides a novel relief mechanism which instantaneously operates and is responsive to the destructive conditions. This mechanism comprises a pair of arcuate guides 50 and 51 fastened on the interior sides of the side walls 18 and 19 of the rotor housing. These guides provide upwardly facing arcuate channels 52 and 53 which admit peripheral edge flange portions 54 and 55 of a trough shaped bottom section 56 of the rotor housing. In the relieved position, the rotor housing develops an open bottom, as best seen in FIGURE 4, which in normal operating position is closed by the trough portion 56. The trough shaped portion 56 comprises an arcuate bottom wall 58 which at its leading end 59 is connected as by bolts 60 to the depending portion 61 of the shear bar 14. It will be seen that the portion 59 is offset outwardly of the portion 61 and the two are lapped together so that the remaining portion of the bottom wall 58 provides a surface continuity from the shear bar to the generally tangential outlet opening 61 which is defined by the outlet chute 42. The trough portion 56 has a pair of laterally spaced side walls 62 and 63 which are disposed along the interior of the side walls 18, 19. The walls 62, 63 are each provided with journal mountings 64 and 65 about the axis of the shaft 22 on portions of the bearings 20 and 21 whereby the trough portion is rotatable about the same axis as the rotor.

The bottom trough portion 56 is maintained in closing position to the bottom by the means of releasable means in the form of shear pins 70 and 71 which respectively connect the side walls 62 and 63 to the side walls 18 and 19 of the rotor housing. Thus, when an unshearable object is presented on the shear bar the cutting knife across the shear bar will impact against the object and since the object is not shearable the shear pins 70 and 71 will be sheared and the trough portion will be rotated from the position shown in FIGURE 1 to the position in FIGURE 4 thus opening the bottom and permitting the object to drop out. In order to prevent the lower trough portion from freely rotating about the shaft 22, there is provided a combination brake and stop mechanism generally designated 75. This structure comprises a conventional brake shoe 76 of any composition as well known to those skilled in the art which has engagement with the exterior side 77 of the arcuate wall portion 58 of the bottom trough 56. The shoe 76 is carried within a holder 77', the shoe having a lower edge 78 which is adapted to abut against a shoulder 79 provided on the lower outer side of the shear bar. The brake shoe structure is self-energizing and has its axis of pivot at 80 which is provided by a torsion rod 81 secured to ears 82 on the backside of the loader 75. The torsion bar extends generally horizontally and mounts at one end on an ear 83 which is formed as a rearward extension of the wall 19 and has splined connections intermediate its ends as at 84 and 85 to the ears 82, 82 of the brake shoe holder and at its other end projects through a rearward ear extension 86 on the wall 18 and is connected to a windup arm 87. Arm 87 after having been rotated to sufficiently wind up the torsion bar is suitably connected as by bolt 88 to the side wall 18.

It will be appreciated that various forms of spring means may be used to provide adequate pressure of the brake shoe against the wall 58. It will be realized in the present instance that the faster the housing portion 56 rotates the more self energization will occur in the brake mechanism and control is afforded in proportion to the force being exerted. A violent impact between the shear bar and the brake shoe is avoided.

It will also be noted that the wall 58 in the released position of the mechanism as shown in FIGURE 4 closes the outlet opening and thus prevents the metallic or unshearable object from being delivered into the forage. At the same time the bottom of the housing is open and any excess material is thus deposited onto the ground which prevents plugging.

*Description of FIGURES 5 and 6*

The structure of FIGURES 5 and 6 is essentially identical with that shown in the previous embodiments and, therefore, common parts are identified by correspondent reference numerals.

In the present embodiment, the structure 56 has its peripheral flange portions, flange portion 54 being herein shown, abutting the respective sidewall of the rotor housing, namely, flange 54 slidably engages on its external side 100 the internal side 101 of the wall 18. The internal side 102 of flange 54 is engaged by a brake shoe 104 which is mounted in a holder 106 formed as part of a mounting bracket 107 which is a spring steel member and as best seen in FIGURE 6 is substantially Z-shaped in cross section. The flanges 108 and 109 constitute the holder 106 and the flange 110 constitutes a mount which is adequately secured to the wall 18 as by rivets or bolts 112. It will be realized that the holder structure 106 as well as the flange 110 are stressed in bending and being of such resilient material spring back and bias the friction shoe into engagement at 102 with the internal side of the flange 54.

It will be understood that two of such structures or brake holders are mounted on the rotor housing, namely, on the walls 18 and 19 and that each embraces the respective flange and each serves with its lower edge 115 as a stop for abutment by the lower edge portion 79 of the shear bar 14. In all other respects, the structure functions and operates as heretofore described in connection with the previous embodiments.

In each embodiment the bottom of the housing opens to exit the unshearable object. Furthermore, a double wall thickness is provided over the top of the housing to prevent the object from being thrown through upwardly.

It will be understood that in view of the foregoing disclosure various embodiments of the invention will now become apparent to those skilled in the art within the scope of the appended claims.

I claim:

1. In a chopper having a generally cylindrical housing including a pair of opposed side walls and means providing arcuate wall sections between said side walls and defining circumferentially spaced inlet and outlet openings, a shear bar mounted on one of the sections for movement therewith and normally disposed along one edge of said inlet opening, a rotary cutter head journalled between said side walls and having knife means in shearing coaction with the shear bar pursuant to rotation of the rotor, and a break-away connection securing said one section to the housing and accommodating separation of said one section from the housing attendant to introduction of an unshearable object between the shear bar and the rotor knife means as said knife means tends to shear such object against the shear bar.

2. In a rotary chopping device, a rotor housing having a pair of opposed generally vertical side walls and arcuate upper and lower wall sections between the side walls defining circumferentially spaced inlet and outlet openings, said lower wall section having an edge portion disposed in the operating position of said device at the lower edge of the inlet opening, a shear bar mounted on said edge portion, a rotor within the housing having knife means cooperative with the shear bar, means swingably mounting said lower wall section about an axis accommodating movement of said lower wall section in a direction away from said inlet opening, shear means connecting said lower wall section with the housing for holding said lower section in said operative position and shearable upon the entry of an unshearable object between the shear bar and knife means during rotation of said rotor to accommodate said movement of said lower section with said shear bar.

3. In a rotary chopper, a generally cylindrical housing having a pair of upright laterally spaced side walls and peripheral circumferential spaced upper and lower sections defining an inlet opening and a substantially tangential outlet opening, a rotor within the housing rotatable on an axis extending transverse of said side wall and having peripheral knife blades sweeping within said peripheral sections, means pivotally mounting said lower wall section about said axis of rotation of the rotor, shear means on said lower section cooperative with the blades, said lower section having an operative position disposing said shear means to form a lower edge of said inlet opening, and a break-away connection holding said lower section in said operating position to predetermined load limit and releasable upon said shear means being loaded beyond said limit whereupon said lower section is caused to swing about said axis and open the lower portion of the housing.

4. The invention according to claim 3 and said lower section having a portion disposed across said outlet opening for closing the same coincident with said lower portion of the housing being open.

5. The invention according to claim 3 and brake means supported by said cylindrical housing engaging said lower section for braking swinging movement thereof.

6. In a rotary material chopper, a housing including a pair of laterally spaced side walls and intervening peripheral circumferentially spaced sections defining inlet and outlet openings, a rotary cutter within the housing, coacting cutting means on one of said sections and the cutter, and means mounting said one of said sections for movement with respect to the other section to enlarge said inlet opening from a predetermined normal dimension upon the introduction of an unshearable object between said cutting means on the one section and the cutter during cutting coaction therebetween.

7. The invention according to claim 6 and means supported by said housing brakingly engaging said one section to resist said movement thereof.

8. The invention according to claim 6 and means on the housing engageable with said one section for limiting movement thereof.

9. The invention according to claim 6 and said mounting means comprising connections on said one section swingable about the axis of rotating of the rotary cutter and said one section swingable to a position closing said outlet opening.

10. In a rotary material chopper, a housing including a pair of laterally spaced side walls and intervening peripheral circumferentially spaced sections defining inlet and outlet openings, a rotary cutter within the housing, coacting cutting means on one of said sections and the cutter, and means mounting said one of said sections for movement with respect to the other section to enlarge said inlet opening from a predetermined normal dimension upon the introduction of an unshearable object between said cutting means on the one section and the cutter during cutting coaction therebetween, and coincidentally closing said outlet opening.

11. The invention according to claim 6 and said mounting means having an axis of pivot about the axis of rotation of the cutter and braking means supported by said cylindrical housing in engagement with said one section resisting said movement of the one section.

12. In a chopper having a generally cylindrical housing with circumferentially spaced inlet and outlet openings, a structure releasably mounted in a position between said openings and defining a material confining surface between said openings and including shear bar means at one edge of the inlet opening, and a rotor mounted in the housing having knives in material shearing cooperation with the shear bar, and means releasably mounting the structure in said position and releasable attendant to the introduction of an unshearable object between the shear bar and knives during cutting coaction therebetween to minimize damage.

13. In a material chopper, a generally cylindrical housing having a pair of laterally spaced side walls and peripheral upper and lower circumferentially spaced sections defining inlet and outlet openings, a rotor in the housing having knives movable past said openings, means on the lower section having shearing cooperation with the knives, said rotor having a shaft journalled through the side walls and providing an axis of rotation for the rotor, said lower section being trough-shaped having a pair of laterally spaced side walls disposed inwardly of and adjacent to respective side walls of the housing, means journalling the side walls of the lower section about said axis, means releasably holding said lower section in operative position, and said lower section upon release adapted to rotate about said axis to open the bottom of said material chopper and to close said outlet opening.

14. The invention according to claim 13 and means mounted on the side walls of the housing and providing guide means for said lower section and said side walls of said lower section having guided engagement with said guide means.

15. The invention according to claim 13 and a brake element in engagement with the lower section and mounted upon the housing.

16. The invention according to claim 13 and a brake element in engagement with the lower section and mounted upon the housing, and means yieldably urging said element to the lower section and said element being self-energizing.

References Cited

UNITED STATES PATENTS

| | | | |
|---|---|---|---|
| 2,298,830 | 10/1942 | McGillis | 130—6 |
| 2,842,175 | 7/1958 | Thompson | 146—123 |
| 2,998,834 | 9/1961 | Carlson et al. | 146—118 |
| 3,126,931 | 3/1964 | Blanshine et al. | 146—117 X |

W. GRAYDON ABERCROMBIE, *Primary Examiner.*